July 10, 1934. J. G. FARKAS 1,965,887

ANTISKID CHAIN

Filed May 6, 1933

INVENTOR:
John G. Farkas
BY David E. Carlsen
ATTORNEY.

Patented July 10, 1934

1,965,887

UNITED STATES PATENT OFFICE 1,965,887

ANTISKID CHAIN

John G. Farkas, St. Paul, Minn.

Application May 6, 1933, Serial No. 669,722

2 Claims. (Cl. 152—14)

This invention relates to improvements in antiskidding devices of the kind generally known as anti-skid chains for use on automobile tires. Although designed primarily for use on pneumatic tires this device is applicable also to solid tires.

The main object of the invention is to provide a highly efficient traction and anti-skid device the design of same being such that its use will not damage the road surface and yet provide ample traction on slippery roads or in ruts in which driving conditions are usually extremely difficult.

The invention consists of certain novel features of construction and combinations of various material whereby the device is rendered particularly useful for the purposes above set forth and hereinafter fully described, reference being had to the accompanying drawing, in which,—

Figure 4:
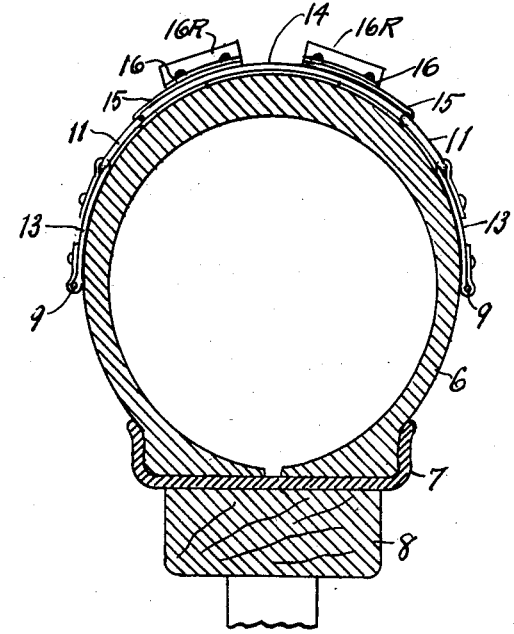
Fig. 4 is a sectional elevation of a pneumatic tire and showing part of my anti-skid device in operative position.

Referring to the drawing by reference numerals, 6 designates an automobile tire (in Figs. 4 and 5), 7 the usual tire-rim and 8 the wheel rim.

Figure 1:
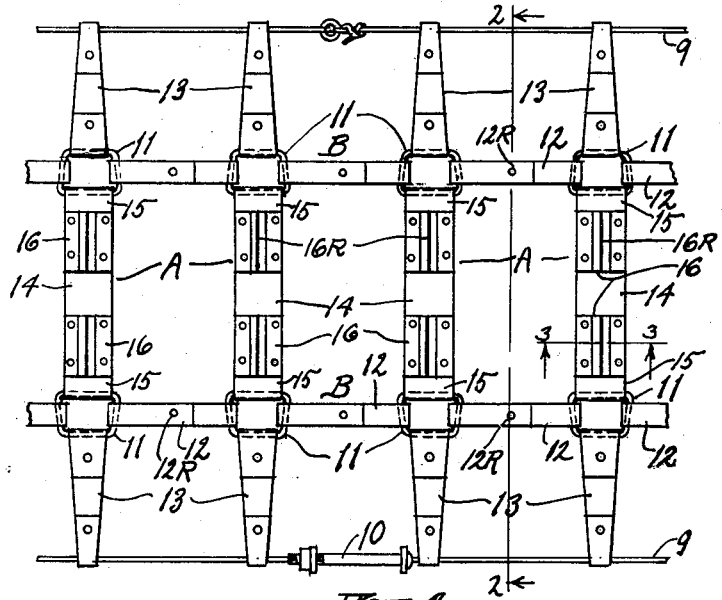
Fig. 1 is a face view of a section of my improved anti-skid device flattened out and showing only four of its cross-tread members.
Figure 2:
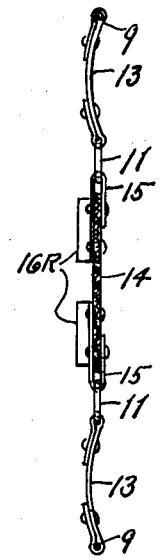
Fig. 2 is an edge view of one of the cross-tread members about as on line 2—2 in Fig. 1.

My improved device involves the use of two opposite side loops 9 of cable or other suitable material, adapted to engage simultaneously the opposite sides of the tire concentrically, and the ends suitably connected adjustably as at 10 in lower part of Fig. 1.

The loop cables retain the opposite end parts of a series of cross-tread members designated A as a whole in Fig. 1 and provided in a sufficient number to bear against the outer exterior or "tread" face of the tire transversely and in regularly spaced relation. These tread members are connected by a pair of longitudinally disposed link means, parallel to the cables, said means designated B as a whole in Fig. 1, both the cross treads A and longitudinal means B being hereinafter fully described in detail.

Figure 5:
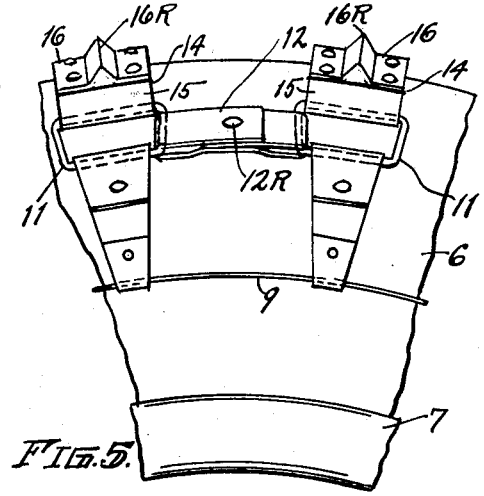
Fig. 5 is an enlarged side elevation of a portion of a tire and two adjacent cross-tread members thereon.

At each intersection of members A and B I provide a link 11, in the form of a quadrilateral in which the angular ends are positioned longitudinally of the tire, the shorter side outward (nearest a cable 9). The longitudinal members B comprise mainly a series of flat metal loop members 12 each engaging the adjacent angular parts of a pair of links 11 and each loop preferably riveted centrally as at 12R. These loops are of course of quadrangular form, in top view, and made comparatively flat as best shown in Fig. 5 in which view is also clearly shown that each link 12 is frictionally engaged interiorly of each loop and across its full width by one of the angular end bars of a link 11, the angularity of each end bar being compensated for by the curvature of the tire and consequent angular positions of each adjacent pair of cross-treads A.

Each cross-tread member A comprises three parts, 2 exterior counterpart members designated 13 and a central main cross-tread member 14. The outer members comprise preferably each a sheet metal strip looped to pivotally engage the outer bar of a link and thence extending in preferably a tapered shape to, and looped at its outer extremity about a cable 9.

The main tread strap 14 is preferably a tough pliable material such as leather or a heavy fabric, either adapted to bear against the outer surface of a tire. At opposite ends of each strap 14 is secured to it a sheet metal clamp 15 extending slightly beyond the end of the strap, where its loop provides a bearing for the inner bar of a link 11. Thus each link 11 is a bearing member for 4 parts of the anti-skid device, namely two of the longitudinal links 12, and an outer transverse strap 13 and the inner main tread strap 14. And at each link 11 is thus provided a flexible joint or intersection.

Figure 3:
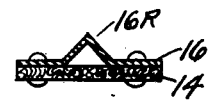
Fig. 3 is an enlarged transverse sectional view of one of the cross-treads as on line 3—3 in Fig. 1.

Obviously the straps 14 are the main ground contacting members or traction element. On the outer face of each strap 14 I provide a pair of metal lugs 16, each ridged centrally as at 16R and longitudinally of the strap to provide additional traction contact. These lugs are preferably riveted on the strap and may be readily replaced. The ridges 16R need be only of nominal height, and may be either hollow as indicated in Fig. 3 or solid as shown in Fig. 5.

It will be readily understood that under normal driving conditions straps 14 provide ample ground contact and lugs 16R being relatively small will not damage pavement surfaces yet will provide good traction contact on ice, or snow or in relatively soft or slippery places. There is ample flexibility in all the cross members A and longitudinal members B for the entire device to normally "hug" the exterior areas of the tire, and to yield according to distortion of a tire from its normal shape when it is in contact with the road.

I claim:

1. A traction device for vehicle tires comprising a series of spaced cross-members adapted to lie transversely on the outer tread and adjacent curved parts of a tire, a pair of parallel straps connecting said cross-members each of the latter comprising series of elongated flat link, an open metal link elongated in the direction of the latter strap and at the intersection of each strap and a cross-member, each cross-member comprising a flat outer section pivotally connected to one of said open links and a central flat and flexible center section between each pair of transversely registering open links, and a contractible loop for each side of the tire, each slidably engaging the outermost ends of the outer cross-member sections and a series of metal calks secured to said flexible center sections of the cross-members, each calk member comprising an elongated outwardly directed tapered ridge formed with flanged base for attaching purpose.

2. A non-skid and traction device for vehicle tires comprising a series of connected cross members adapted to lie transversely on the outer tread and adjacent curved side parts of a tire, and suitable flexible ring means engaging the extremities of the end parts of the cross members, each cross member comprising a flexible elongated main tread section, and a pair of non-flexible end sections an open link intermediate the adjacent ends of said tread section and each said end section and pivotally connected therewith, a pair of parallel, sectional straps comprising a series of flat metal links connecting said open links in transverse relation to the cross members, and a pair of metal traction cleats fixed on each flexible section of the cross members, one adjacent each end thereof, each said cleat comprising a flat metal base and an integral elongated rib of approximately inverted V-shape in cross section.

JOHN G. FARKAS.